United States Patent [19]

Vives

[11] Patent Number: 5,061,113
[45] Date of Patent: Oct. 29, 1991

[54] ANCHORING DOWEL COMPOSED OF TWO TWISTED HALF-DOWELS

[75] Inventor: Michel Vives, Eysines, France

[73] Assignee: Societe Europeenne de Propulsion, Suresnes, France

[21] Appl. No.: 485,129

[22] Filed: Feb. 26, 1990

[30] Foreign Application Priority Data

Mar. 1, 1989 [FR] France .............................. 89 02678

[51] Int. Cl.⁵ .............................................. F16B 13/04
[52] U.S. Cl. .................. 403/408.1; 403/297; 403/409.1
[58] Field of Search ............ 403/290, 297, 344, 408.1, 403/409.1; 411/54, 75, 79–80, 446–448, 480, 513, 515, 530

[56] References Cited

U.S. PATENT DOCUMENTS

| | | | |
|---|---|---|---|
| 201,378 | 3/1878 | Allen | 403/297 X |
| 2,519,464 | 8/1950 | Haseltine | 37/142 R |
| 3,175,314 | 3/1965 | Williamson | 37/142 A |
| 3,398,800 | 8/1968 | Bennett | 37/142 A |
| 3,879,147 | 4/1975 | Morell | 403/409.1 X |
| 4,464,076 | 8/1984 | Leibhard | 403/297 |
| 4,518,291 | 5/1985 | Lang et al. | 403/297 X |
| 4,711,234 | 12/1987 | Vives et al. | 411/446 X |

FOREIGN PATENT DOCUMENTS

| | | | |
|---|---|---|---|
| 0116161 | 8/1984 | European Pat. Off. | |
| 1400825 | 11/1968 | Fed. Rep. of Germany | |
| 2122350 | 11/1972 | Fed. Rep. of Germany | 403/297 |
| 2505878 | 9/1976 | Fed. Rep. of Germany | |
| 3314109 | 10/1984 | Fed. Rep. of Germany | 411/75 |
| 8628212 | 1/1987 | Fed. Rep. of Germany | |
| 2266039 | 10/1975 | France | 411/75 |
| 2594027 | 8/1987 | France | |
| 1442702 | 7/1976 | United Kingdom | 403/297 |

Primary Examiner—Peter M. Cuomo
Assistant Examiner—Franco S. De Liguori
Attorney, Agent, or Firm—Weingarten, Schurgin, Gagnebin & Hayes

[57] ABSTRACT

The invention relates to an anchoring dowel (11) for joining two bodies (7, 8). The dowel is composed of two contacting half-dowels (11a, 11b) whose opposing faces (13a, 13b) are helical surfaces twisting in opposite directions. The projecting ends of the half-dowels are thus mutually spread apart with respect to contact zones (19a, 19b), which are compressed by the joined bodies (7, 8) so ensuring the anchoring of the dowel.

14 Claims, 3 Drawing Sheets

ANCHORING DOWEL COMPOSED OF TWO TWISTED HALF-DOWELS

BACKGROUND OF THE INVENTION

1. Field of the Invention

The present invention relates to an anchoring dowel for joining two bodies by insertion of the dowel therebetween. The dowel comprises two complementary half-dowels in mutual contact, each half-dowel having a similar semi-cylindrical configuration and being delimited, at an outer face of the dowel, by a portion of a cylindrical surface of revolution and, at an inner face of the dowel, by a contacting surface for the other half-dowel. The configuration of the two half-dowels is such that the dowel formed thereby is elastically compressible in a transversal direction.

2. Prior Art

A dowel of the above type is disclosed in French Patent No. 2,594,027. One of the half-dowels of this dowel comprises at one end a projection turned towards the other half-dowel. This creates an expansion at the corresponding end of the dowel when the two half-dowels are inserted into place through the bodies to be joined and submitted to compressive forces from the latter, causing them to flex elastically.

Although this dowel has a well-proven structure, it nevertheless has a number of drawbacks:

its end must imperatively extend beyond the bodies to be joined, so as to allow the two half-dowels to spread apart and flex. Accordingly, it cannot be used to affix a body having just a blind hole, for instance;

the compressive forces from the bodies joined by the dowel are concentrated at narrow zones on the dowel's perimeter, and are consequently badly distributed over its length;

at least one of the half-dowels has a complicated shape, which leads to high manufacturing costs.

SUMMARY OF THE INVENTION WITH OBJECTS

The object of the present invention is to overcome the above drawbacks by providing a dowel that does not require any projection outside the bodies to be joined, that provides a better force distribution and that has a simple shape amenable to economic manufacture.

These objects are achieved with a dowel of the above type, in which the contacting surfaces of the two half-dowels forming the dowel are skewed surfaces formed with a slight lingitudinal twist in mutually opposite directions.

This very simple shape given to the two half-dowels makes the dowel capable of being elastically compressed throughout its length, thus allowing effective use of the dowel even when the latter does not project outside the bodies to be joined, the compressive forces being uniformally distributed along the section through the bodies.

More specifically, the contact surface of each half-dowel is a helical surface sharing a common axis with the portion of a cylindrical surface of revolution, the helical surfaces of the two complementary half-dowels turning respectively towards the right and left around the axis through less than one quarter turn along the length of the half-dowels. The latter condition ensures an untwisting effect with the elastic reaction in all cases under the transversal compressive loads applied to the dowel after its insertion through the bodies to be joined.

In a very simple embodiment, the two complementary half-dowels are symmetric elements with respect to a plane. In other words, each half-dowel is the mirror image of the other.

The above-mentioned portion of a cylindrical surface of revolution that delimits the outer surface of each half-dowel can extend throughout the length of the latter, which provides a dowel having a generally cylindrical shape. The half-dowels can also be provided with a bulge at one end forming a half-head, the two half-heads of the two complementary half-dowels together forming a head for the dowel formed thereby.

The inventive dowels can be produced in a very simple and economic way, with a minimum of waste material. Indeed, the two half-dowels can be obtained by slicing two bars having a circular cross-section longitudinally along a diametrical line thereof, the line progressing along each bar and rotating around the axis thereof, towards the right for one of the bars and towards the left for the other bar, after which the thus-sliced bars are cut into successive portions.

If needs be, the above-mentioned bars may comprise spaced apart peripheral bulges yielding a half-head on each of the half-dowels produced by slicing and cutting the bars.

In practice, the slicing of the bars can be carried out by either laser cutting or by a high pressure water jet.

The dowel according to the present invention offers the following main advantages:

it can be used for a variety of joints, particularly since it can be put into place by inserting half-dowels into the bodies not only one after the other, but also together by forceful insertion, and either in a through hole or in a blind hole;

the constituent half-dowels have a simplified shape, making it possible to use fast, high-precision mass production methods which reduce the number of rejects due to inaccurate dimensions;

it provides perfect quality joints, with an excellent distribution of forces between the bodies and the dowel.

The dowel according to the invention has applications in the field of bone surgery, where it can be used with bio-compatible implants to be affixed on the bone, as well as for assembling thermo-structural composite elements to produce engine or space vehicle parts (flame-retention arms, after-burn flaps or ports, rocket nozzles, space shuttle components, etc.).

BRIEF DESCRIPTION OF THE DRAWINGS

Other characteristics and advantages of the invention shall be more clearly understood from the following description of preferred embodiments given as a non-limiting example, with reference to the appended drawings in which.

DESCRIPTION OF THE PREFERRED EMBODIMENTS

Figure 1:
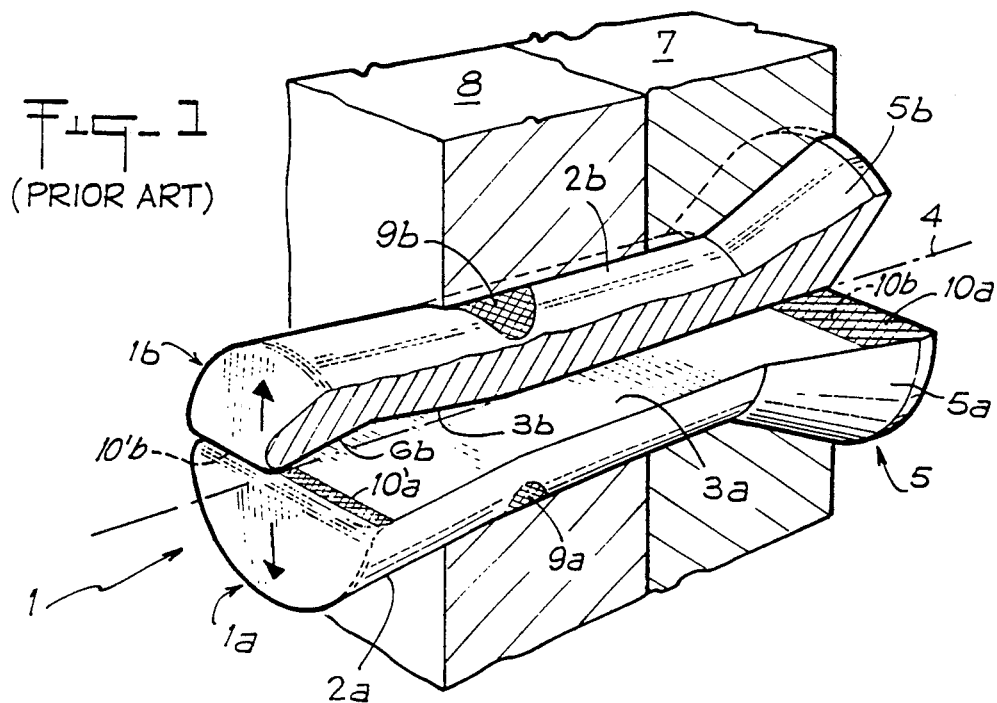
FIG. 1 is a perspective view of a prior art anchoring dowel.

The prior art dowel 1 depicted in FIG. 1 is formed of two half-dowels 1a, 1b in mutual contact, each having a substantially semi-cylindrical external rounded surface 2a, 2b and a contacting surface 3a, 3b extending in the region of a longitudinal plane separating the two half-dowels 1a, 1b and passing through the dowel's axis 4. The half-dowels terminate at an end portion by half-heads 5a, 5b that together form a substantially frusto-conical head 5 for the dowel 1. The contacting surface 3b of half-dowel 1b is not perfectly planar; near its end opposite the half-head 5b, it presents a blocking ramp 6b producing a gradual thickening of the half-dowel at that end. To join two plates 7, 8 using such a dowel, confronting holes are drilled through these two plates. The confronting holes have a diameter equal to, or slightly greater than, that of the dowel formed by the two contacting half-dowels, the diameter being measured in the vicinity of the head 5. The first half-dowel 1b is then inserted in the holes, and then the second half-dowel 1a is inserted in the holes by forcing the latter to progress until the two half-heads 5a, 5b come into juxtaposition. The free ends of the two half-dowels that extend beyond the plates 7, 8 to be joined spread apart by flexing elastically as a result of the presence of the blocking ramp 6b thereby preventing the retrieval of the dowel 1. In the above situation, the compressive forces between the two half-dowels 1a, 1b are exerted at the zones indicated by the cross-hatching, namely a pair of zones 9a, 9b on the rounded outer surface of the half-dowels, in the region of their projecting portions, and two pairs of zones 10a, 10b, 10'a, 10'b, respectively in the region of the half-heads 5a, 5b and at the other end of the half-dowels, opposite the terminal portion of the blocking ramp 6b of half-dowel 1b. The contact zones 9a, 9b on which are applied the forces produced by the mutual spreading apart of the projecting ends of the two half-dowels inserted into plates 7, 8, have a fairly restricted area.

Figure 2:
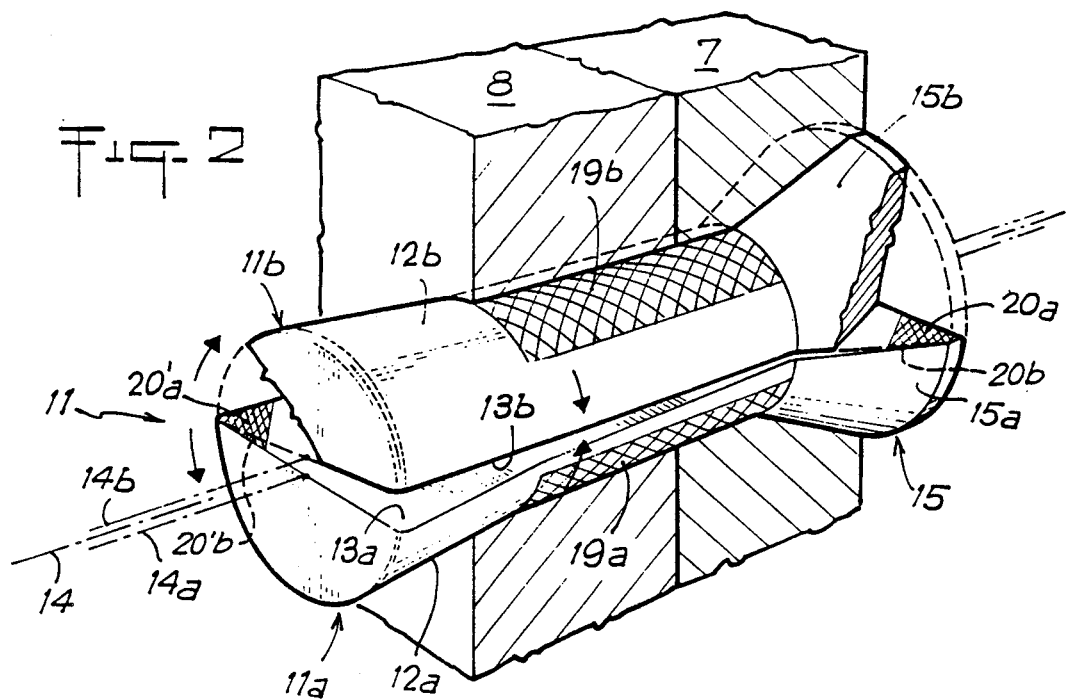
FIG. 2 is a view similar to that of FIG. 1, of an anchoring dowel according to the present invention.

FIG. 2 shows a dowel according to the present invention. The dowel 11, which has a structure similar to that of the dowel 1 described above, also comprises two contacting half-dowels 11a, 11b each defining a substantially semi-cylindrical rounded external surface 12a, 12b, a contacting surface 13a, 13b extending in the region of a longitudinal separation plane passing along the dowel's axis 14, and a half-head 15a, 15b. The projecting ends of the two half-dowels, once inserted through the two plates 7, 8 to be joined, spread apart, thus preventing the retrieval of the composite dowel 11.

However, the separating effect is in this case no longer obtained by means of a blocking ramp on the contacting surface of one of the half-dowels, but by virtue of the special shape given to the two contacting surfaces 13a, 13b of the half-dowels 11a, 11b. These surfaces are helical surfaces that twist respectively to the right and to the left of the axes 14a, 14b of the half-dowels. The latter coincide with the respective axes of their corresponding semi-cylindrical surfaces 12a, 12b and are located on either side of the axis 14 of the dowel 1. The half-dowels inserted in the registering holes of plates 7,8 tend to untwist due to the compressive force produced by the plates on the half-dowels, since the half-dowels are in mutual contact at zones 20a, 20b and 20'a, 20'b located at their ends on either side of the axis 14. The compressive force is distributed along zones 19a and b which are much longer and hence have a larger surface than the zones 9a, b of dowel 1 of FIG. 1, providing a better distribution of the forces between the plates 7, 8 and the dowel 11.

Figure 3:
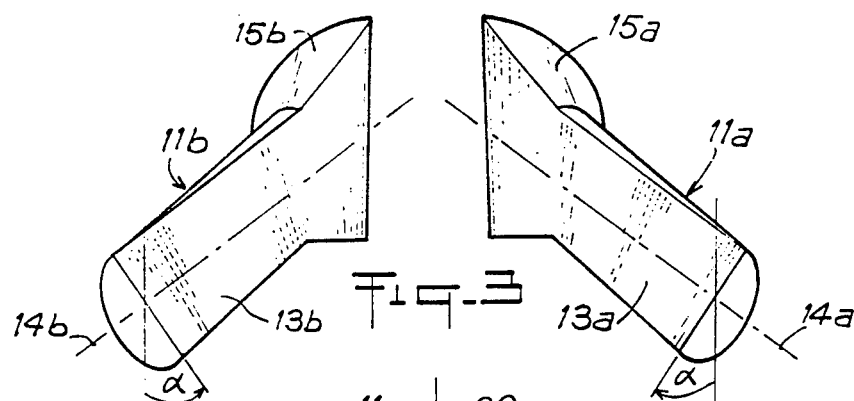
FIG. 3 is a three-quarter view on a smaller scale of the two parts of a dowel according to the invention.

The twisted shape of the contacting surfaces 13a, 13b of the half-dowels 11a, 11b are clearly shown in FIG. 3. Each is a helical surface, possessing the same axis 14a, 14b as the corresponding semi-cylindrical outer surface 12a, 12b, and turns about its axis along the length of the dowel by an angle $\alpha$, towards the right for one of the half-dowels and towards the left for the other. To achieve the correct elastic untwisting effect when the two half-dowels are placed into contact, the angle $\alpha$ must be less than 90° and should preferably not exceed 45° so that the angle $\beta$ subtended by the contacting surfaces 13a, 13b at one or the other of the ends of the half-dowels 11a, 11b when joined together (FIG. 4) is in all cases less than 180°. It may be noted that the half-dowels define everywhere, except at the half-heads, an identical transversal cross-section in the form of a half-disk.

Figure 4:
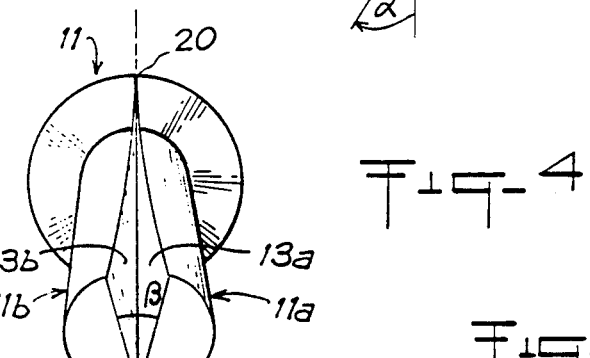
FIG. 4 shows the two parts of FIG. 3 after contact to form a dowel.
Figure 5:
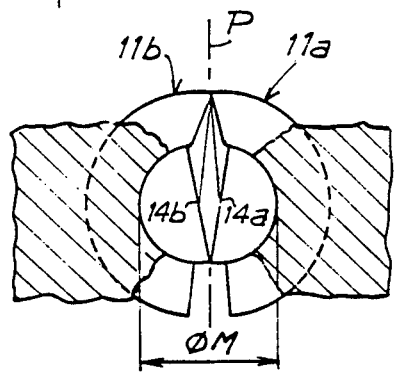
FIGS. 5 and 6 show the dowel of FIG. 4 seen end-on, respectively without compressive forces and in a crushed state state due to a compressive force.
Figure 6:
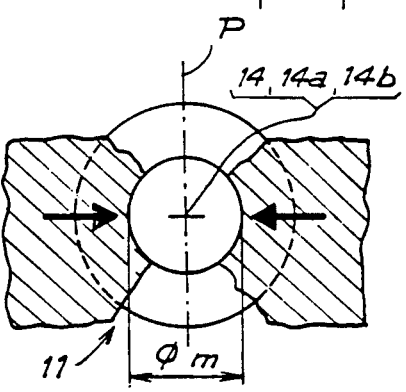

The two half-dowels of FIG. 3 contacting each other as in FIG. 4 are symmetrical with respect to a plane P that passes along the axis of the thus formed dowel 11 and at the contact points of the ends of the half-dowels, which correspond to the above-mentioned zones 20a, 20b, 20'a, 20'b (FIG. 2). The maximum diameter of the dowel 1, when no compressive forces are applied, has a specific value $\phi_M$ (FIG. 5) that depends on the diameter of each of the half-dowels and the twist angle $\alpha$ of the contacting surfaces of the latter. If the dowel 11 is submitted to a sufficient compressive force, tending to bring together the two half-dowels on either side of the symmetry plane P, the half-dowels tend to flatten and untwist elastically, their contacting surfaces straightening to become planar and aligned with the plane P (FIG. 6), and the three above-mentioned axes 4, 4a, and 4b coming into coincidence. In this situation, the diameter of the dowel 11 reduces to a minimum value $\phi_m$ (equal to the diameter of each half-dowel) that is less than the value $\phi_M$ when there are no compressive forces. The diameter of the registered holes drilled in the two plates 7,8 to receive a dowel 11 for joining them will have a diameter of between $\phi_m$ and $\phi_M$.

FIGS. 7a through 7h show various examples of use of a dowel such as described above.

Figure 7A:
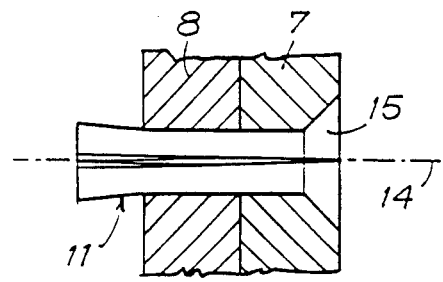
FIGS. 7a through 7h show various types of joints obtained by means of a dowel according to the invention, depicted in a cross-sectional view along a plane passing through the axis of the dowel.

In the example of FIG. 7a, the dowel 11 is provided with a head 15 and used to join together two plates 7, 8. Plate 7 is counter-sunk to receive the head 15 while the length of the dowel is such that it projects beyond plate 8. This example corresponds to the configuration depicted in FIG. 2.

Figure 7E:
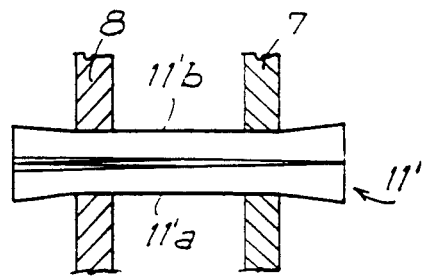
Figure 7B:
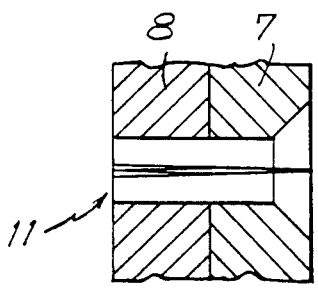
Figure 7F:
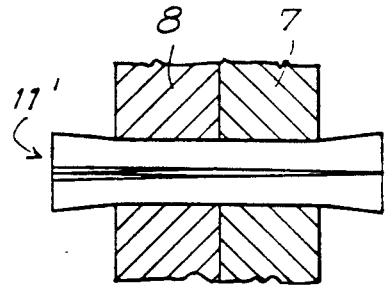
Figure 7C:
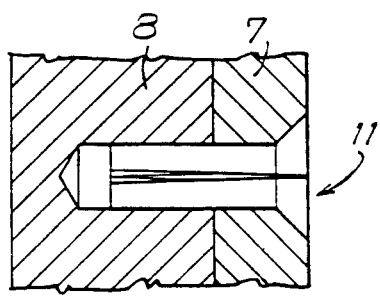

The examples of FIGS. 7b and 7c are similar to that of FIG. 7a, the difference being that the length of the dowel 11 is equal (FIG. 7b) or less than (FIG. 7c) the total thickness of the plates 7, 8. In the latter case a blind hole is drilled into plate 8 for receiving the dowel 11.

Figure 7G:
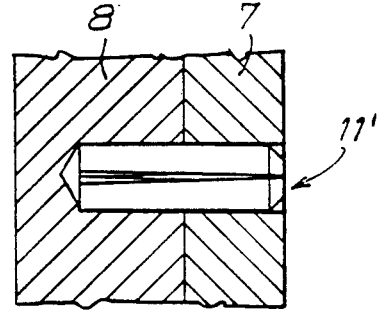
Figure 7D:
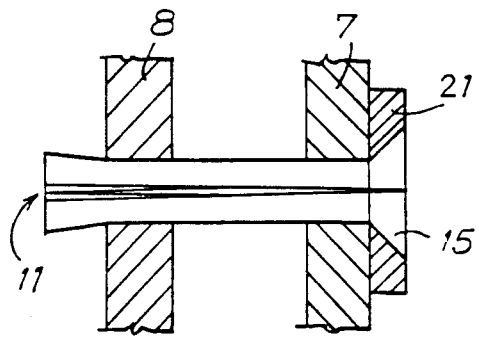

In the case of FIGS. 7d and 7e the two plates 7, 8 to be joined together are no longer juxtaposed but spaced apart. The dowel 11 of FIG. 7d is fitted with a head, received in the counter-sunk portion of a pressure washer 21 on the plate 7, while the dowel 11' of FIG.

7e, formed by two entirely semi-cylindrical half-dowels 11'a, 11'b, is devoid of any head, the joint thereby having a perfectly symmetrical configuration.

The same symmetrical configuration can be found in the example of FIG. 7f, which differs from that of FIG. 7e only by the fact that the two plates 7 and 8 are juxtaposed one against the other.

Figure 7H:
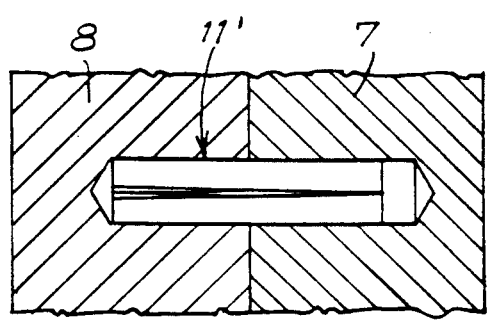

The example depicted in FIG. 7g corresponds to that of FIG. 7c, with a dowel 11' devoid of a head. Finally, the example depicted in FIG. 7h is that of FIG. 7g in which the dowel 11' would be entirely sunk in blind holes drilled in each of the respective plates 7, 8. In the last two examples, the dowel serves as a positioning slug over which plate 7 is forced into position after its insertion into the blind hole of plate 8.

It may be noted that among the preceding above examples, only those of FIGS. 7a and 7d would be feasible with a prior art dowel of the type shown in FIG. 1, which must necessarily project beyond the assembled plates, on one side only, and which cannot accommodate a blind hole. The inventive dowel shown in FIG. 2 makes it possible to obtain these other examples, by virtue of its capability of elastic radial compression throughout its length.

In order to permanently set the joint obtained by a dowel 11 or 11', glue may be used to fill in the slot remaining between the two half-dowels.

In the case of dowels used in bone surgery, the gluing results from an osteal growth which covers the surface of the dowel within the space of a few days; in such applications the dowel is made of a carbon-carbon composite material.

In the field of assembly of thermo-structural composite material parts (C/C, C/SiC, SiC/SiC, etc.), the gluing is obtained by carbonization of a resin having a high coke concentration or by chemical vapor deposition of carbon or silicon carbide.

Once glued, the dowel can only be removed by drilling.

Figure 8:
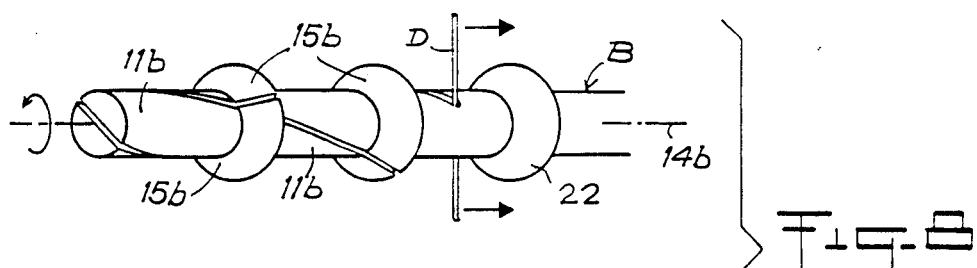
FIG. 8 illustrates a method for producing anchoring dowels according to the present invention.
Figure 8:
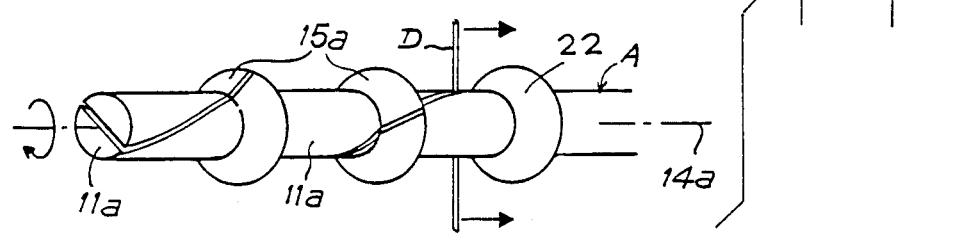

FIG. 8 shows a method for manufacturing half-dowels 11a, 11b fitted with a head 15a, 15b. Bars A and B, machined to the shape and dimensions of the dowels when aligned end to end, are cut out using a laser or a high-pressure water jet along a very fine diametrical line D (of the order of 0.1 to 0.5 mm diameter) that is advanced continuously along the axis 14a, 14b of each of the bars, the latter being provided with a uniform rotational movement about their axis, one in one direction and the other in the opposite direction. Each bar is thus split into two separate halves by a helical slot. The pitch of the helical surfaces cut out from the bars, on the right for bar B and on the left for bar A, is identical for both bars. After cutting each of the bars at the dowel's desired length, the two half-dowels 11a, 11b, obtained from bars A and B respectively, are joined to obtain a complete dowel. In the present case, the bars are provided with bulges 22 the spacing between which corresponds to the length of each dowel, and the half-dowels are consequently provided with a half-head 15a, 5b.

The slicing pitch of bars A, B, which determines the pitch of the twist of the helical contacting surfaces 13a, 13b and hence the elastic compressive properties of the dowels, is chosen as a function of several parameters including the following:

the torsional characteristics of the material forming the dowel;

the elastic distortion properties of the material forming the bodies to be assembled;

the tolerance obtainable over the diameter of the bars and that of the holes receiving the dowels;

the width of the helical cut of the bars; and the characteristics of the type of joint (with or without projection, via a through hole or a blind hole, with or without a head, etc.).

What is claimed is:

1. An anchoring dowel for joining two bodies by insertion of the anchoring dowel therebetween, said anchoring dowel comprising two complementary half-dowels in mutual contact, each of said half-dowels having a similar semi-cylindrical configuration having a longitudinal axis and being delimited at an outer face of said dowel by a portion of a cylindrical surface of revolution defined about said longitudinal axis and, at an inner face of said dowel, by a contacting surface extending transversely across said longitudinal axis and contacting the other half-dowel, the configuration of said two half-dowels being such that said anchoring dowel is elastically compressible in a direction normal to said longitudinal axis, said contacting surfaces of said two half-dowels forming said anchoring dowel being of helical comfiguration defined by longitudinal helical surfaces extending in mutually opposite directions.

2. An anchoring dowel as claimed in claim 1, wherein the contacting surface of each half-dowel is a helical surface sharing a common axis with said portion of a cylindrical surface of revolution, said helical surfaces of said two complementary half-dowels turning respectively towards the right and left around said axis through less than one quarter-turn along the length of said half dowels.

3. An anchoring dowel as claimed in claim 1, wherein said two complementary half-dowels are symmetric elements with respect to a plane through said longitudinal axis.

4. An anchoring dowel as claimed in claim 1, wherein said portion of a cylindrical surface of revolution delimits each half-dowel throughout the length thereof.

5. An anchoring dowel as claimed in claim 1, wherein each half-dowel has a bulge at one end thereof, forming a half-head, the two half-heads of said two complementary half-dowels together forming a head for the dowel formed thereby.

6. An anchoring dowel as claimed in claim 1, wherein said half-dowels are produced by slicing two bars having a circular cross-section longitudinally along a diametrical line thereof, said line progressing along each bar and rotating around the axis thereof, towards the right for one of said bars, and towards the left for the other of said bars, followed by cutting the thus-sliced bars into successive portions.

7. An anchoring dowel as claimed in claim 1, wherein each half-dowel has a bulge at one end thereof, forming a half-head, the two half-heads of said two complementary half-dowels together forming a head for the dowel formed thereby, and the half-dowels are produced by slicing two bars having a circular cross-section longitudinally along a diametrical line thereof, said line progressing along each bar and rotating around the axis thereof, towards the right for one of said bars, and towards the left for the other of said bars, followed by cutting the thus-sliced bars into successive portions, said rods comprising spaced apart peripheral bulges giving rise to a half-head on each of said half-dowels produced by slicing and cutting said bars.

8. An anchoring dowel as claimed in claim 6 or 7, wherein said slicing of said bars is achieved by laser cutting.

9. An anchoring dowel as claimed in claim 6 or 7, wherein said slicing of said bars is achieved by high-pressure water jet cutting.

10. An anchoring dowel for joining two bodies said anchoring dowel comprising:

two half dowels, each half dowel comprising a portion of a cylinder defined by a longitudinal axis of rotation, each half dowel further being semi-cylindrical in cross-section at all points along the axis of rotation, the cylinder portion comprising a first surface comprising a portion of a cylindrical surface and a second surface extending transversely across the longitudinal axis and having a helical configuration defined by the axis of rotation, the helical configuration of one of said half dowels further being helical in a direction opposite the direction of the helical configuration of the other of said half dowels;

said second surfaces of said half dowels being in mutual contact to define said anchoring dowel; such that the respective axes of rotation of each half dowel are substantially parallel, the anchoring dowel formed thereby being compressible in a direction transverse to the axes of rotation of each half dowel such that the helical configuration of each second surface tends to flatten to a planar configuration and the second surfaces tend to come into contact.

11. A method for producing an anchoring dowel, comprising:

providing two bars each having a circular cross-section about a longitudinal axis;

slicing each of the two bars longitudinally along a diametrical line thereof, said line progressing along inner surfaces of each of said bars and rotating around the longitudinal axis thereof towards the right for one of said bars and towards the left for the other of said bars to thereby form said surfaces with a helical configuration; and cutting the thus-sliced bars into successive portions, each successive portion comprising a half-dowel;

joining a half-dowel from one bar with a half-dowel from the other bar to form a complete dowel such that said helical inner surfaces of said half-dowels are in mutual contact and define helical surfaces extending in mutually opposite directions.

12. The method for producing an anchoring dowel as claimed in claim 11, further comprising providing each bar with bulges spaced along the longitudinal axis, the spacing corresponding to a length of a dowel, the bulges forming a half-head for each half-dowel when said bars are sliced and cut, two half-heads of two half-dowels together forming a head for the complete dowel formed by joining the two half-dowels.

13. The method for producing an anchoring dowel as claimed in claim 11, wherein said slicing of said bars is achieved by laser cutting.

14. The method for producing an anchoring dowel as claimed in claim 11, wherein said slicing of said bars is achieved by high-pressure water jet cutting.

* * * * *